United States Patent [19]
Vatt et al.

[11] Patent Number: 5,894,590
[45] Date of Patent: Apr. 13, 1999

[54] INDEPENDENT SATELLITE-BASED COMMUNICATIONS SYSTEMS SHARING COMMON FREQUENCY SPECTRUM AND METHOD OF OPERATION THEREOF

[75] Inventors: Gregory Barton Vatt, Mesa; Dennis Paul Diekelman, Tempe, both of Ariz.; John E. Major, Barrington Hills, Ill.

[73] Assignee: Motorola, Inc., Schaumburg, Ill.

[21] Appl. No.: 08/509,677

[22] Filed: Jul. 31, 1995

[51] Int. Cl.$^6$ .................................................. H04B 7/185
[52] U.S. Cl. .................... 455/12.1; 455/428; 455/430; 455/63
[58] Field of Search ........................ 455/12.1, 13.1, 455/13.2, 13.4, 422, 427, 428, 429, 430, 62, 63, 67.1, 69; 342/352, 353, 354

[56] References Cited

U.S. PATENT DOCUMENTS

| | | | |
|---|---|---|---|
| Re. 34,410 | 10/1993 | Rosen | 343/781 P |
| 3,963,990 | 6/1976 | DiFonzo | 325/476 |
| 4,240,079 | 12/1980 | Zhilin | 343/100 |
| 4,425,639 | 1/1984 | Acampora et al. | 370/50 |
| 4,879,711 | 11/1989 | Rosen | 370/50 |
| 4,943,808 | 7/1990 | Dulck et al. | 342/356 |
| 4,985,706 | 1/1991 | Schukat | 342/352 |
| 5,227,802 | 7/1993 | Pullman et al. | 342/352 |
| 5,379,320 | 1/1995 | Fernandes et al. | 375/1 |
| 5,394,561 | 2/1995 | Freeburg | 455/13.1 |
| 5,408,237 | 4/1995 | Patterson et al. | 342/354 |
| 5,415,368 | 5/1995 | Horstein et al. | 244/158 R |
| 5,574,968 | 11/1996 | Olds et al. | 455/428 |

FOREIGN PATENT DOCUMENTS 1-88270  4/1989  Japan.

OTHER PUBLICATIONS

Knudsen et al. "Sharing between main beam downlink LEO and uplink GSO Satellites in the 1–3 GHz allocations" Report of IWP 815 to the JIWP, Jan. 28, 1991.

*Primary Examiner*—Thanh Cong Le
*Attorney, Agent, or Firm*—Walter W. Nielsen; Harold C. McGurk; Frank J. Bogacz

[57] ABSTRACT

Multiple, different, independent constellations (10, 20) of satellites (2, 21–23) share a portion of a common frequency spectrum such as a single carrier frequency. The satellites' antennas (11) may be either multi-beam or omni-directional, while those of earth stations (13, 14) are directional. When interference occurs between communications of a satellite (31) of a first constellation (10) and a satellite (41) of a second constellation (20), any of several interference-mitigation options may be employed, such as the first satellite (31) handing off communications to a second satellite (32) of the same constellation (10), or temporarily suspending communications. The remedial action may occur in response to either predicted or detected interference.

4 Claims, 6 Drawing Sheets

5,894,590

1

INDEPENDENT SATELLITE-BASED COMMUNICATIONS SYSTEMS SHARING COMMON FREQUENCY SPECTRUM AND METHOD OF OPERATION THEREOF

RELATED INVENTION

The present invention is related to the following invention which is assigned to the same assignee as the present invention:

(1) Satellite System Cell Management, U.S. Pat. No. 5,227,802.

TECHNICAL FIELD

The invention relates to satellite communications, and, in particular, to a method for sharing a portion of a common frequency spectrum (typically a common frequency band or carrier frequency) by multiple, independent constellations or configurations of satellites.

BACKGROUND OF THE INVENTION

Satellite communications systems transmit information to and receive information from users, either directly via user-held units or via ground-based or vehicle-based stations (e.g. in automobiles, trucks, airplanes, ships, etc.).

Such information may constitute voice, paging information, audio-visual information, FAX data, and so on.

An increasing number of independent satellite communications systems are in the planning, capitalization, implementation, or operational stages, and each system is competing with other systems to obtain operational licenses from appropriate geo-political jurisdictions to what constitutes a very limited amount of radio frequency spectrum.

Therefore, there is a substantial need to provide a way for two or more independent satellite-based communications systems to share a common frequency spectrum.

There is also a substantial need to provide a method of operating two or more independent satellite-based communications systems which share a common frequency spectrum, such as a common frequency band or carrier frequency.

There is also a substantial need for an earth station in a satellite communications system which can predict or detect interference in communications between it and two or more different satellites, or between at least one other earth station and two or more different satellites, and take appropriate measures to report and/or mitigate such interference.

DETAILED DESCRIPTION

Figure 1:
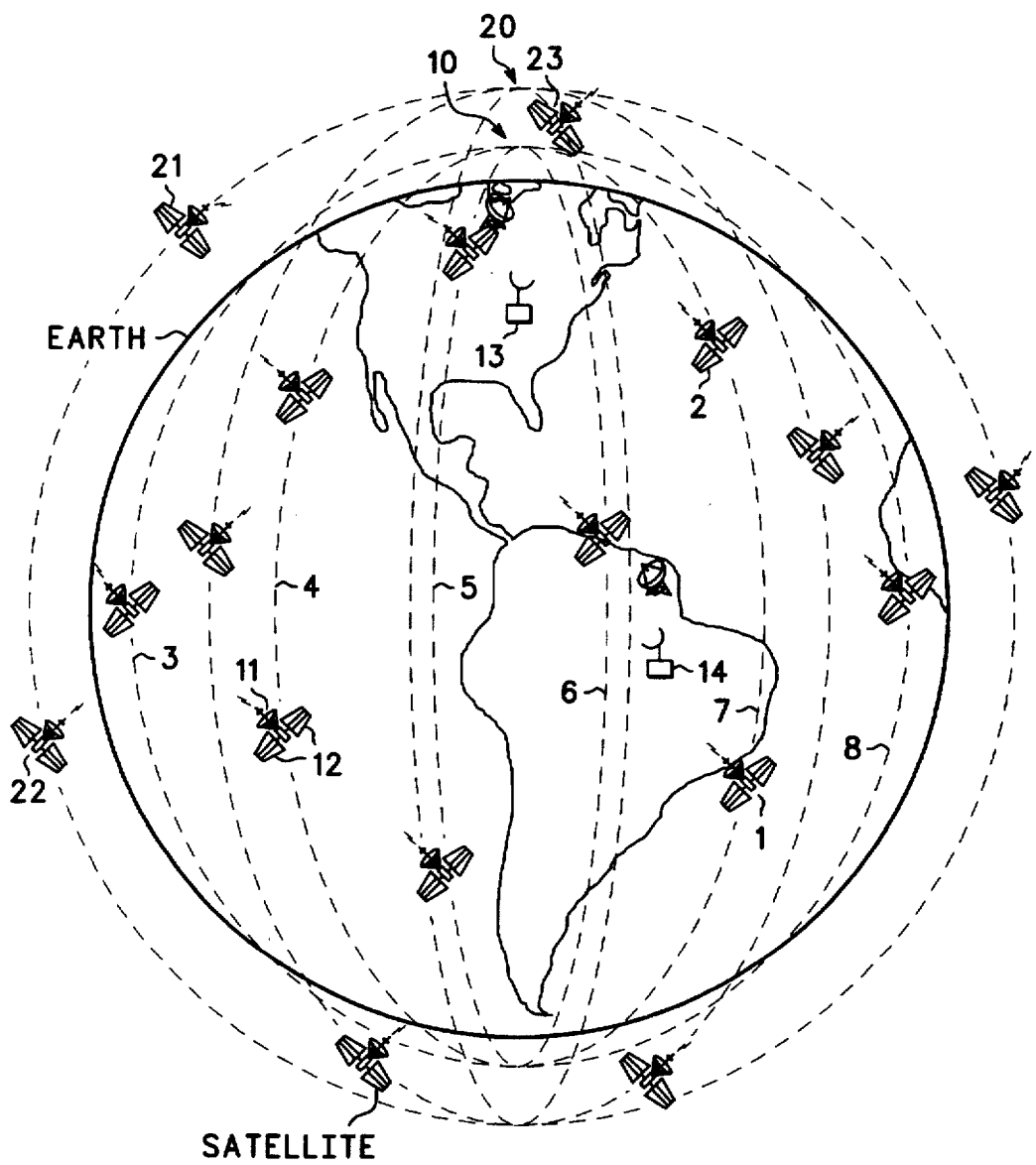
FIG. 1 shows an overview diagram of two different, independent constellations of communications satellites in accordance with the present invention.

FIG. 1 shows an overview diagram of two different, independent constellations of communications satellites in accordance with the present invention. FIG. 1 shows two separate constellations 10 and 20 each comprising a plurality of satellites circling the earth. Any given constellation 20 will very probably be different from another constellation 10, for example in the altitude of the satellites or their orbital inclination (i.e. the angle their orbits make with the earth's equator).

It will be recognized by one of ordinary skill in the art that the present invention may be more easily implemented when all satellites are positioned at the same altitude and orbital inclination and when the orbits of the satellites are phased with respect to the equator to provide sufficient spatial diversity as to minimize interference from adjacent satellites of different constellations.

Constellations 10 and 20 merely happen, by way of example, to show satellites in polar orbit (90 degree inclination), the satellites of constellation 20 being at a higher altitude than those of constellation 10. The satellites of constellation 10 may transmit the same or different information from that transmitted by constellation 20.

Figure 4:
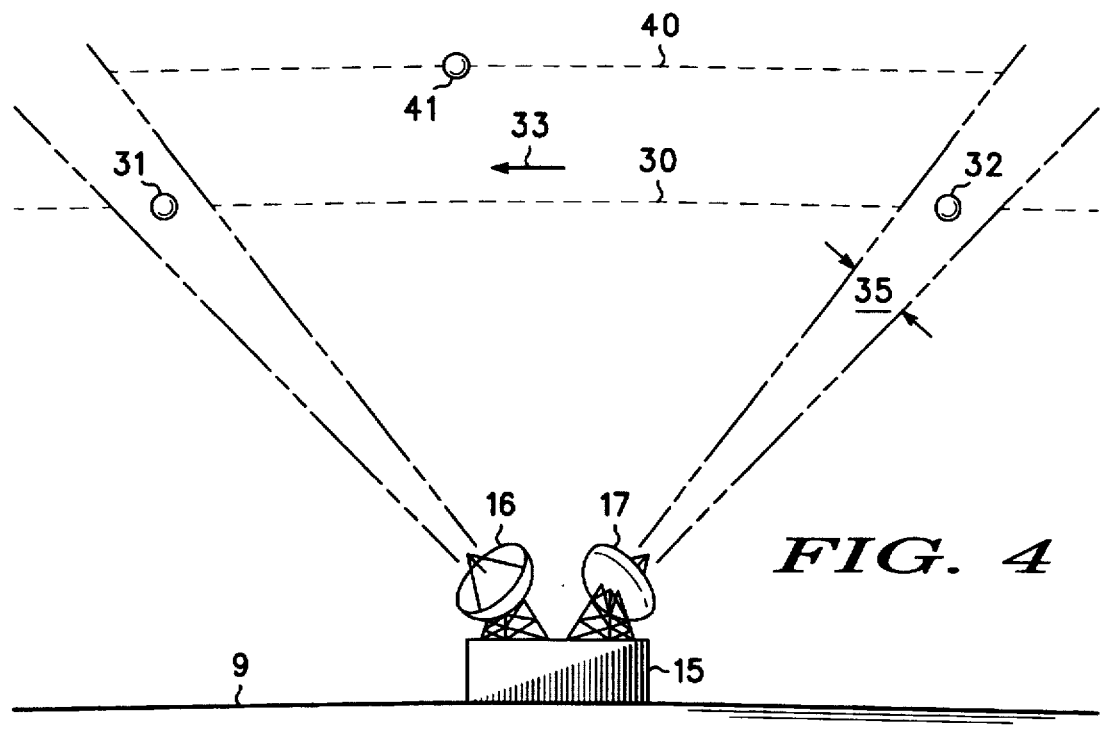
FIG. 4 shows a diagram illustrating satellites at two different altitudes, wherein one of a plurality of satellites at a first altitude is communicating with a ground station, in accordance with one aspect of the present invention.

In FIG. 1 the antennas of the satellites project multi-beam antenna patterns on the surface of the earth. The antennas of earth-based stations 13 and 14 are uni-directional, so that as a satellite passes over, the earth station antenna tracks the desired satellite. This is shown in FIG. 4, wherein antenna 16 of earth station 15 tracks satellite 31 as it moves in its orbit relative to the earth 9 in the direction shown by arrow 33. When satellite 31 moves within a given angle of the horizon of earth station 15, then earth station 15 will switch over to tracking satellite 32 which may be transmitting the same or different information as satellite 31. This could be accomplished, for example, by switching to antenna 17 or using another appropriate technique, such as switching to a different segment of a multi-segment antenna array.

Figure 2:
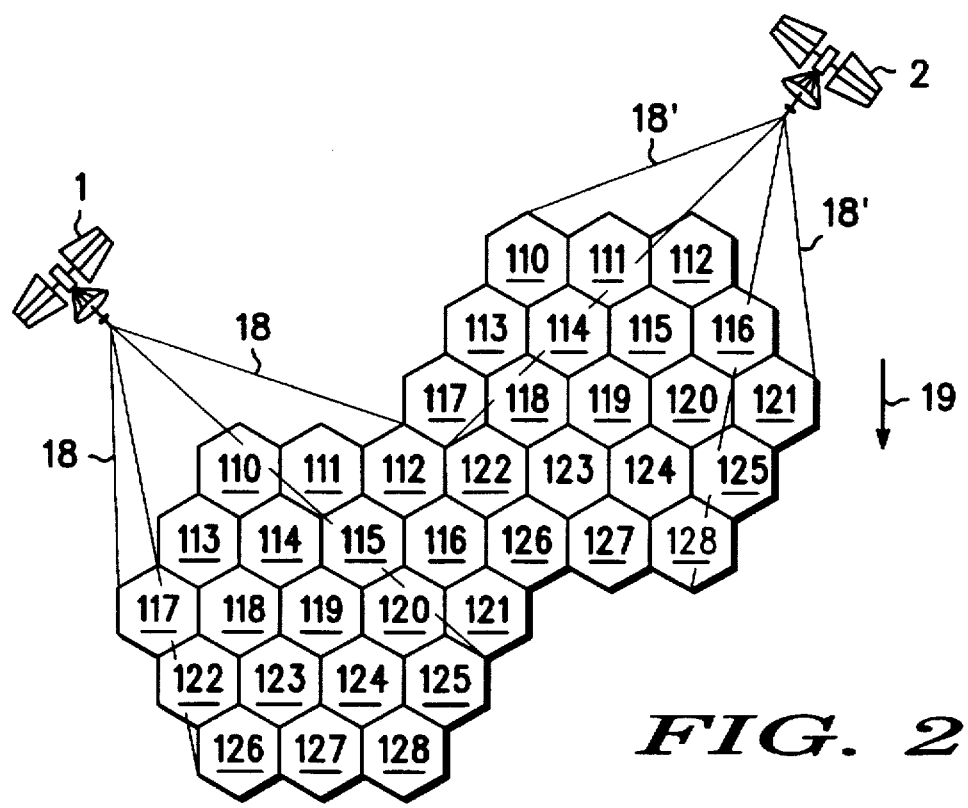
FIG. 2 shows a diagram of cellular patterns, representing a typical case, formed by adjacent satellites of a given constellation of satellites projecting communication beams upon the surface of the earth in accordance with one aspect of the present invention.

FIG. 2 shows a diagram of cellular patterns, representing a typical case, formed by adjacent satellites of a given constellation of satellites projecting communication beams upon the surface of the earth in accordance with one aspect of the present invention. It will also be understood that adjacent satellites need not necessarily project patterns of adjacent cells onto the earth; i.e., the cells projected by one satellite may be interspersed with those of an adjacent satellite.

Satellites 1 and 2 (which may be identical to satellite 1) employ frequency spectrum reuse techniques. These techniques comprise cellular partitioning of projection beam widths. Satellites 1 and 2 generate beam set projections 18 and 18', respectively. Beam set projections 18 and 18' are bi-directional gain areas (cells) associated with antennas on satellites 1 and 2. These antennas may be individual directional antennas or a phased-array antenna capable of coherent beam projection.

Cells 110–128 may assume many shapes depending on the gain characteristics of the antennas. In FIG. 2, cells 110–128 are shown as hexagons for illustrative purposes.

The particular scheme for creating channel diversity within cells 110–128, as employed by any given constellation of satellites, is not critical to the present invention, and it may employ time division multiple access (TDMA), frequency division multiple access (FDMA), code division multiple access (CDMA), narrow beams, directional antenna patterns, and other diversity schemes, or combinations thereof.

It should be understood that cells 110–128 may advance in orbit direction 19 as satellites 1 and 2 orbit in direction 19, or the satellite antenna beams may be temporarily fixed upon specific geographical areas of the earth as they pass over.

Within the present invention, referring again to FIG. 1, satellites 1 may communicate with earth stations 13 and 14 over links which may use multiple frequency channels. In other words, while the entire spectrum is available in each cell, adjacent cells are assigned different time slots within which that spectrum may be used. In a one embodiment, frames are defined to include at least seven different time slots to correspond to the seven-cell reuse pattern. Cells labeled "110" in FIG. 2 are assigned one time slot, cells labeled "111" are assigned another time slot, and so on. That way, cells which utilize the same spectrum at the same time are geographically spaced apart from one another.

While FIG. 2 illustrates a seven-cell, seven time slot arrangement, those skilled in the art will understand that a larger or smaller reuse pattern can also be used. Those skilled in the art will appreciate that such a TDMA communication scheme is established at satellites 1. Moreover, when satellites 1 move at speeds of up to 30,000 km/hr, Doppler shift and time slot synchronization parameters between earth stations 13 and 14 and a satellite 1 constantly change.

Figure 3:
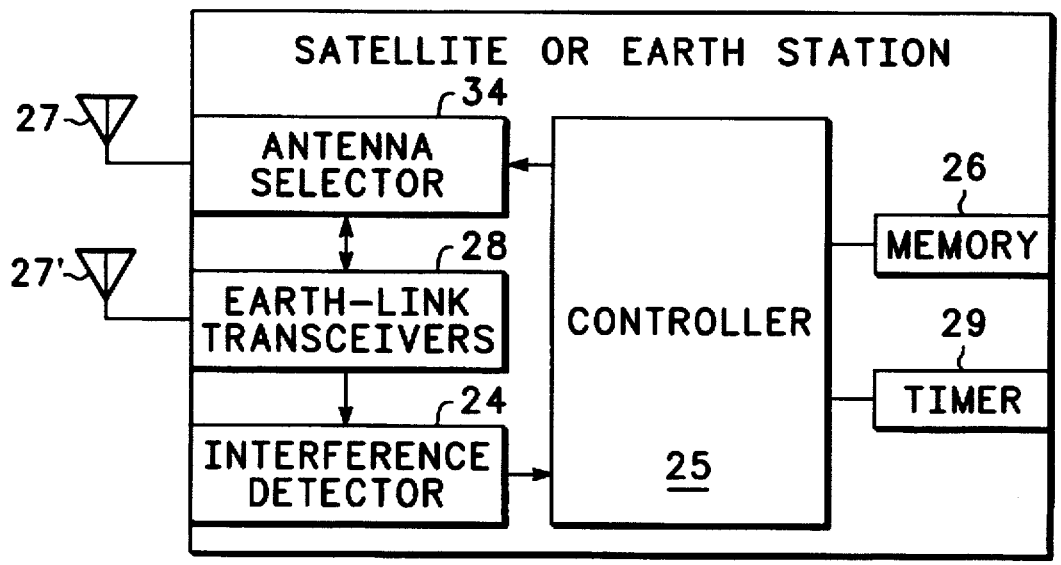
FIG. 3 shows a block diagram of components of a satellite or earth station of a communications system of the present invention.

FIG. 3 shows a block diagram of components of a satellite 1 or earth station 13–15 of a communications system of the present invention.

For example, each satellite includes a controller 25, a memory 26, a timer 29, and earth station link transceivers 28, which communicate with an earth station via antennas 27 or 27'.

Likewise, an earth station may comprise equipment similar to that utilized by a satellite, in the form of one or more suitable antennas 27, 27', interference detector 24, controller 25, memory 26, timer 29, and antenna selector 34. An earth station 13 also includes earth station link transceivers 38, which communicate with a satellite via antenna 27 or antenna 27', depending upon which is selected for communications.

It will be understood that the earth-based stations may assume several different configurations, with varying equipment combinations and performance levels. For example, a ground control earth station will typically have more powerful processors in controller 25 and greater memory capacity in memory 26 than a system user earth station.

Those skilled in the art will appreciate that antennas 27, 27' may be implemented either as a single multi-beam, phased-array antenna or as a bank of discrete, uni-directional antennas.

A controller 25 is coupled to transceivers 28 as well as to an associated memory 26 and a timer 29. Controller 25 may be implemented using one or more processors. Controller 25 uses timer 29 to maintain the current date and time and to time events. Memory 26 stores data and instructions for controller 25. The instructions, when executed by controller 25, cause satellite 1 to carry out procedures which are discussed below. In addition, memory 26 includes variables, tables, and databases that are manipulated due to the operation of satellite 1.

The satellite or earth station equipment shown in FIG. 3 also comprises an interference detector 24, which is coupled to earth-link transceivers 28 and to controller 25. Interference detector 24 may comprise any suitable, well known electronic circuit or software algorithm for detecting the presence of interfering radio-frequency signals. When interference detector 24 detects such interference, it outputs a signal to controller 25, which may take suitable action to mitigate or eliminate such interference as, for example, depicted in the flow charts shown in FIGS. 7 and 8 discussed below.

One form of mitigating action is to select a different antenna 27, 27' in order to communicate with a different satellite in the communications system. Responsive to suitable control signals from controller 25, antenna selector 34 selects either antenna 27 or antenna 27' for carrying on further communications with a corresponding satellite.

One form of mitigating action, regarding a system user's earth station, is to report the presence of interference, via earth-link transceivers 28 and whichever antenna element 27, 27' is active, to the satellite with which the earth station is currently communicating. The interference status may then be reported by such satellite to a ground control earth station, which records such status regarding such satellite and system user earth. In response to such interference condition, the ground control station may initiate a suitable mitigating option, as will be further described below regarding FIG. 7.

FIG. 4 shows a diagram illustrating satellites at two different altitudes, wherein one of a plurality of satellites at a first altitude is communicating with a ground station, in accordance with one aspect of the present invention. In FIG. 4 the presence of another constellation's satellite 41 transmitting different information on the same frequency in orbit 40 does not interfere with the information being transmitted by the satellites 31 and 32 of the constellation whose satellites are moving in orbit 30, because satellite 41 is outside of the received beam angle 35 (typically 2 to 5 degrees) of uni-directional antennas 16 and 17.

Figure 5:
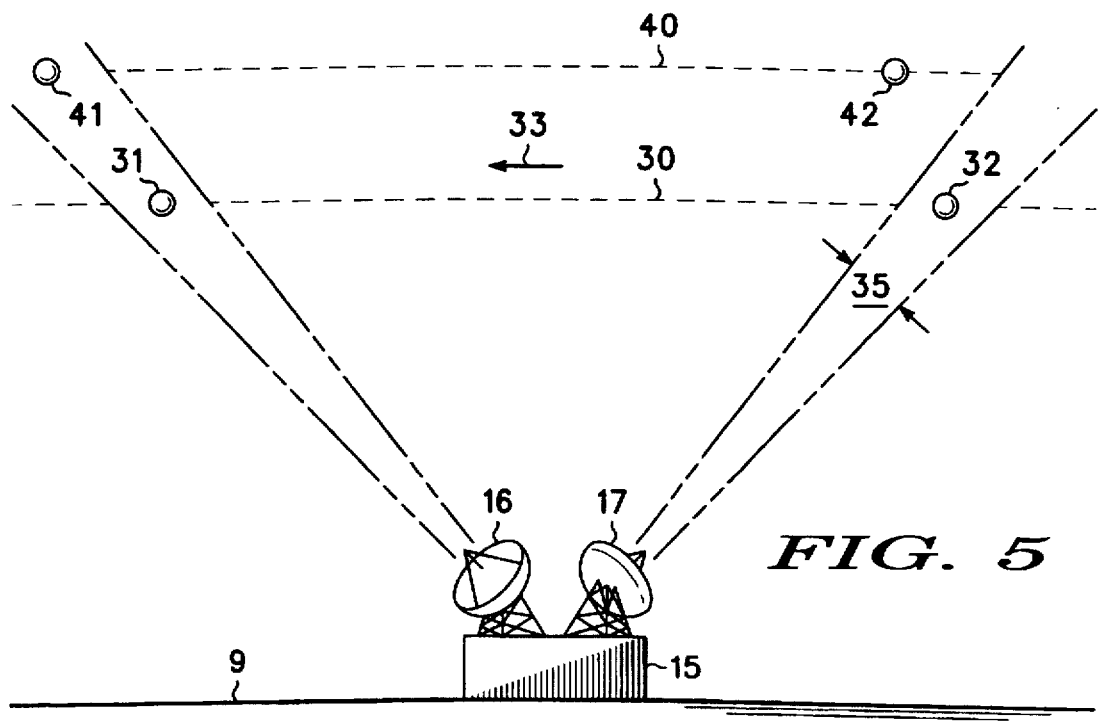
FIG. 5 shows a diagram illustrating satellites at two different altitudes, wherein transmissions from one of a plurality of satellites operating at a first altitude are temporarily interfering with transmissions from one of a plurality of satellites operating at a second altitude, in accordance with one aspect of the present invention.

FIG. 5 shows a diagram illustrating satellites at two different altitudes, wherein transmissions from one of a plurality of satellites operating at a first altitude are temporarily interfering with transmissions from one of a plurality of satellites operating at a second altitude, in accordance with one aspect of the present invention.

In FIG. 5 transmissions from satellite 41 of the constellation whose satellites are moving in orbit 40 may overlap to a greater or lesser degree for some time with those being transmitted by satellite 31 to antenna 16, so that interference occurs between the information being transmitted by satellites 31 and 41 on the same frequency. When interference occurs, earth station 15 switches to antenna 17 and begins listening to satellite 32. It will be understood that antennas 16 and 17 need not be discrete antennas and that they may assume the form of different arrays in a phased-array antenna subsystem.

As described below, if the communications system has current knowledge of the satellites' orbital paths for the satellites of both constellations, it can predict when interference will occur and take suitable measures to avoid it before it occurs, such as switching to a different satellite. This is the preferred approach, because interference may be avoided without affecting the system user.

The odds of interference occurring between satellites of different constellations can be calculated, because the positions of the satellites of each constellation at any time can be calculated, using known techniques; the number of earth stations 15 is known; and the antenna beam angle of the earth station antennas is known.

It will be appreciated by those of ordinary skill in the art that the present invention and method of operation thereof have substantially better success regarding constellations for which any given area of the earth is covered by multiple satellites of the constellation, so that hand-off to a different satellite to avoid interference can take place.

Figure 6:
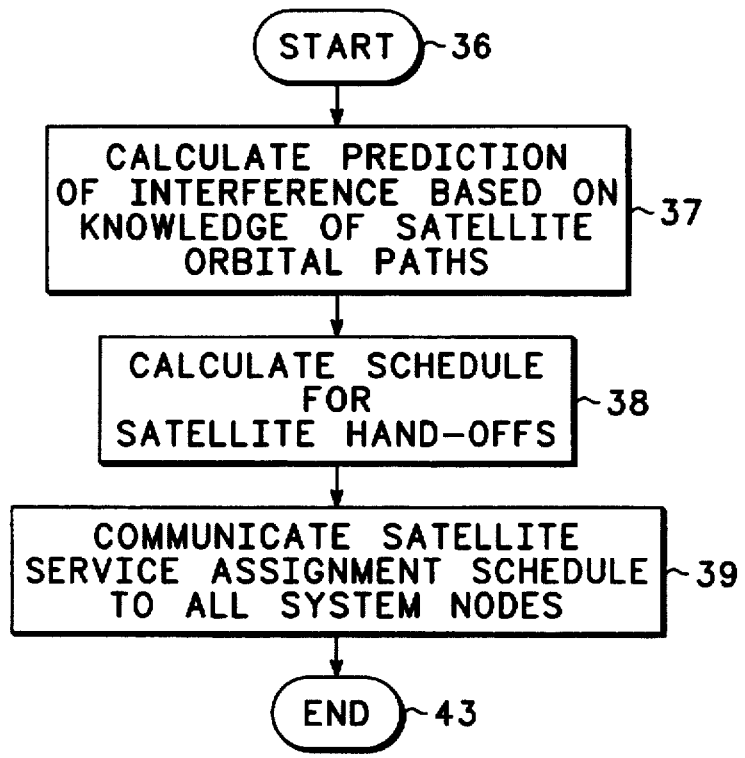
FIG. 6 shows a flow diagram of a method for performing an off-line calculation of a set of rules or schedule for predicting interference in communications within a multi-constellation communication environment in which a common frequency spectrum is shared, in accordance with the present invention.

FIG. 6 shows a flow diagram of a method for performing an off-line calculation of a set of rules or schedule for predicting interference in communications within a multi-constellation communication environment in which a common frequency spectrum is shared, in accordance with the present invention.

First, the process begins in box 36. Then in box 37 the system performs calculations, in a manner well known to a person of ordinary skill, utilizing, in part, current known information concerning the orbital paths of the satellites, the location of all earth stations, and other conditions within the constellation, in order to predict when interference will occur between transmissions from different satellites. As a result of such calculations, the interference times are determined for every satellite in the system.

In box 38, utilizing the calculations performed in the previous step, a set of rules of scheduled hand-offs is created. This schedule contains entries for each satellite as to the starting and stopping times for interference, and the identity of a hand-off satellite candidate to which the satellite can likely hand off communications to avoid interference.

Next in box 39, the schedule created in the previous step is distributed to the memory of various system nodes. By a system node is meant a satellite or an earth station. Thus the schedule is distributed, for example, to satellite processor memories such as memory 26 (FIG. 3) and/or to other processor memories within the system, such as within earth stations 13 and 14.

Finally, this procedure ends in box 43.

Figure 7:
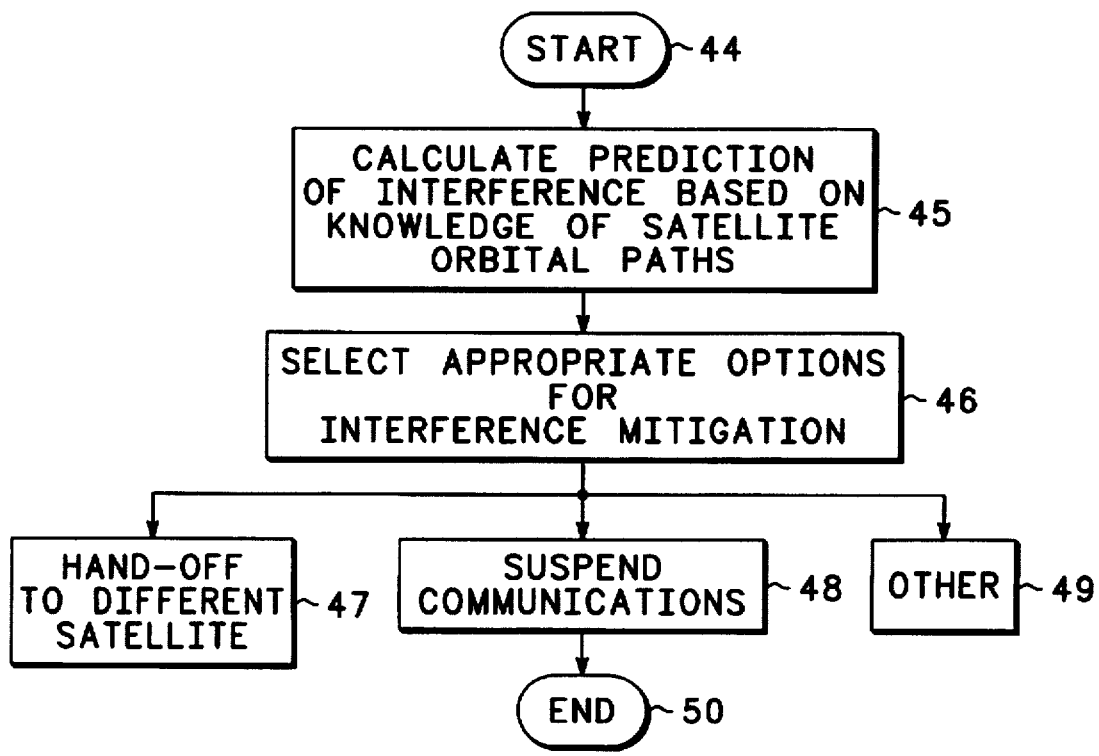
FIG. 7 shows a flow diagram of a method for performing calculations in real time to determine the occurrence of interference in communications within a multi-constellation communication environment in which a common frequency spectrum is shared, in accordance with the present invention.

FIG. 7 shows a flow diagram of a method for performing calculations in real time to determine the occurrence of interference in communications within a multi-constellation communication environment in which a common frequency spectrum is shared, in accordance with the present invention. The method depicted in FIG. 7 may be used, for example, by a given satellite or earth station to predict and avoid interference with other nearby satellites or earth stations.

First, the process begins in box 44. Then in box 45 the satellite or earth station controller performs calculations utilizing, in part, current knowledge of the orbital paths of the satellites, the location of all earth stations, and other conditions within the constellation, in order to predict when interference will occur between transmissions from different satellites, in the manner described above regarding box 37 of FIG. 6. As a result of such calculations, the predicted interference times are determined for this particular satellite or earth station, as shown in step 45.

Next, in step 46, options are determined and evaluated, and a suitable option is selected for this satellite or earth station to mitigate the effect of the predicted interference. As illustrated in FIG. 7 by way of example, but not by way of limitation, various options comprise hand-off to a different satellite (option 47), temporarily suspending communications (48), or some other suitable action (49), such as going to a different channel (i.e., switching to a frequency outside of the frequency spectrum being used), using a lower information rate with higher coding, etc.

Finally, this procedure ends in box 50.

Figure 8:
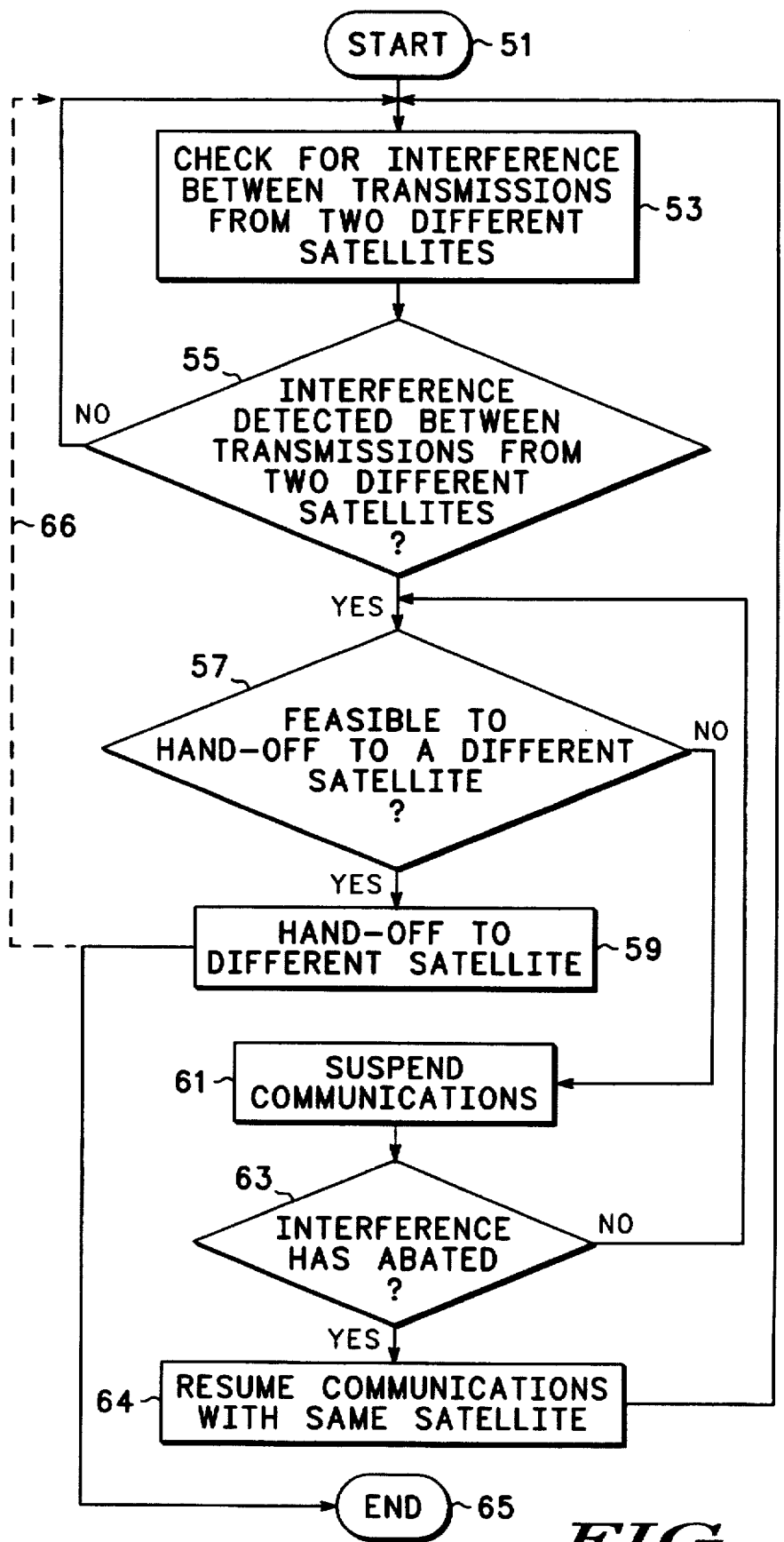
FIG. 8 shows a flow diagram of a method for detecting and mitigating interference in a multi-constellation communication environment in which a common frequency spectrum is shared, in accordance with the present invention.

FIG. 8 shows a flow diagram of a method for detecting and mitigating interference in a multi-constellation communication environment in which a common frequency spectrum is shared, in accordance with the present invention.

First, the process begins in box 51. Next, in box 53 the system checks to determine whether interference is detected between transmissions from two satellites of different constellations. In decision box 55, if such interference is detected, the method proceeds to decision box 57; otherwise it returns to box 53.

In decision box 57, the system determines whether it is feasible to switch the ground station antenna to receive transmissions from a different satellite of the same constellation. If so, the method proceeds to box 59, where such a switch is made, and the procedure ends in box 65. Otherwise, the method proceeds to box 61, where the system suspends communications with the satellite being interfered with. Although in FIG. 8 the procedure is illustrated as terminating after exiting box 59, it will be understood that in actual practice the procedure endlessly repeats, and that the procedure would return to box 53 via dashed line 66 after exiting box 59.

From box 61, the method proceeds to decision box 63, where a check is made to determine whether the interference has abated. If so, the method proceeds to box 64, where communications are resumed with the same satellite, and the method then returns to box 53; otherwise it returns to box 57.

Figure 9:
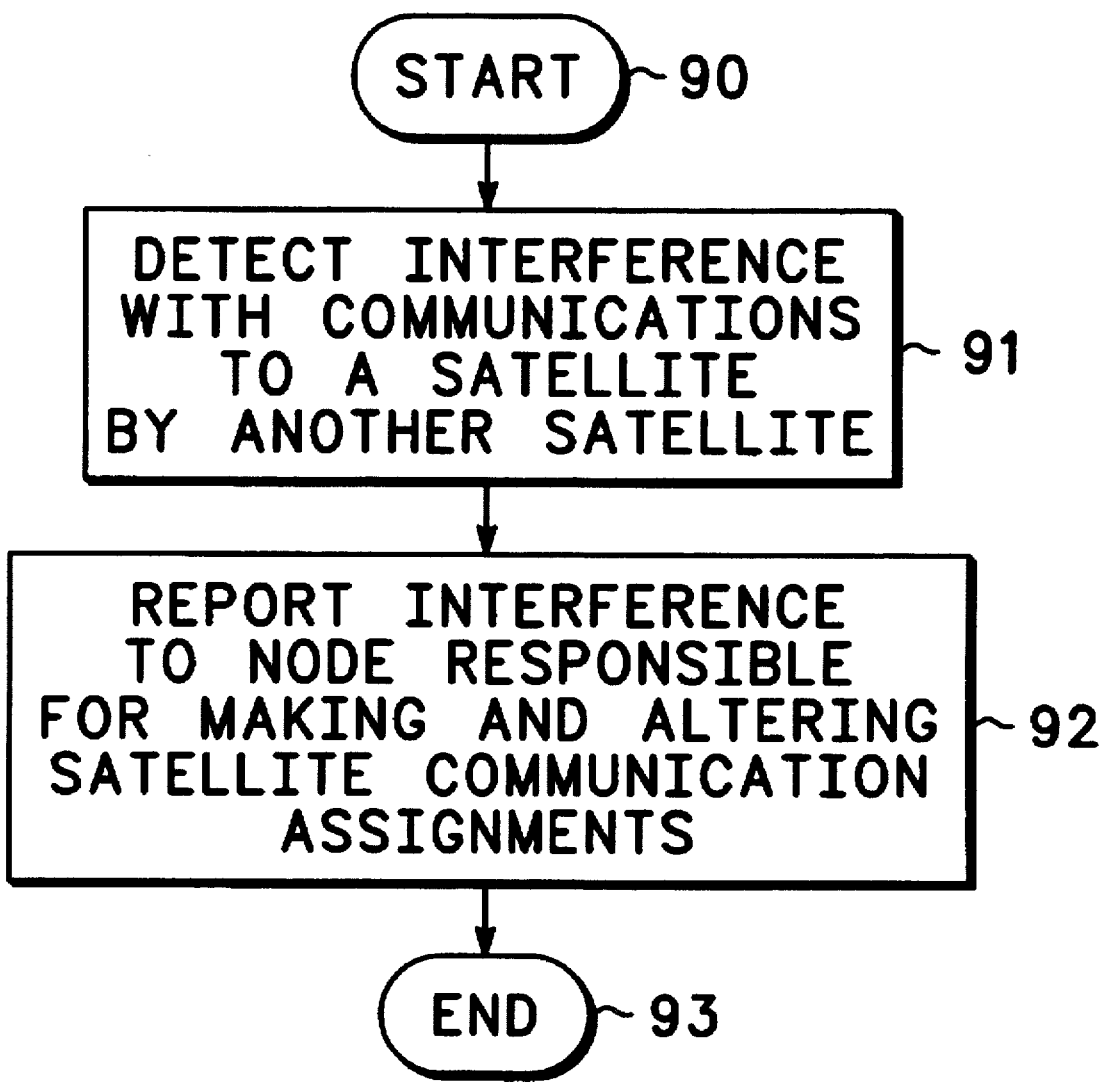
FIG. 9 shows a flow diagram of a method for detecting and reporting interference in a multi-constellation communication environment in which a common frequency spectrum is shared, in accordance with the present invention.

FIG. 9 shows a flow diagram of a method for detecting and reporting interference in a multi-constellation communication environment in which a common frequency spectrum is shared, in accordance with the present invention.

First the process begins in box 90. In box 91 a system user's earth station detects interference with communications to a satellite within such user's own constellation by a satellite of a different constellation. In box 92, the system user's earth station reports the interference to a node within its own constellation, or to a supervisory node coupled to every constellation, which node is responsible for making and altering satellite communication assignments. Based upon such information, the supervisory node can make hand-off requests between satellites to mitigate the effect of the interference.

CONCLUSION

In summary, the present invention enables independent satellite-based communications systems to share a common frequency spectrum and provides an improved method of operation thereof.

It will be apparent to those skilled in the art that the disclosed invention may be modified in numerous ways and may assume many embodiments other than the preferred form specifically set out and described above.

For example, it will be understood by one of ordinary skill in the art that the transmissions from the satellites may be omni-directional or narrow beam, in which case they are not transmitted in the multi-beam pattern shown in FIG. 2.

The present invention may also be utilized to avoid interference within a single constellation of satellites wherein satellites are at different altitudes and inclinations, for example, in a constellation to which replacement or supplemental satellites are added.

It is an important advantage of the present invention that no special coordination is required between two different, independent communications systems, each employing a constellation of satellites which may be positioned at different altitudes and orbital inclinations. The systems may communicate utilizing different channel diversity schemes, but they are assumed to be utilizing the same portion of the frequency spectrum.

The cell patterns of one system may be assumed to at least occasionally interfere with those of another system in any of a multitude of different ways, but the present invention offers a solution to mitigate the effect of such interference while preserving radio frequency spectrum.

Accordingly, it is intended by the appended claims to cover all modifications of the invention which fall within the true spirit and scope of the invention.

What is claimed is:

1. A method of mitigating interference occurring between at least two different communications systems, each system comprising a constellation of communications satellites orbiting the earth, said satellites each comprising a satellite antenna for transmitting and receiving information, each constellation comprising at least one earth-based station, each of said earth-based stations comprising at least one directional earth-based antenna for transmitting information to and receiving information from one or more satellites of its respective constellation, said satellite and said at least one directional earth-based antenna transmitting information on the same portion of the frequency spectrum, said method comprising the following steps:

(a) predicting when a condition will cause interference in communications between said satellites and said earth-based stations; and (b) mitigating said predicted interference by directing said at least one directional earth-based antenna to a different satellite of the same constellation.

2. The method recited in claim 1, wherein said condition is the simultaneous presence of satellites from two or more of said constellations within said at least one said directional earth-based antenna.

3. A method of predicting interference likely to occur between at least two different communications systems, each system comprising a constellation of communications satellites orbiting the earth, said satellites each comprising a satellite antenna for transmitting and receiving information, said system further comprising a plurality of earth-based stations, each of said earth-based stations comprising at least one directional earth-based antenna for transmitting information to and receiving information from one or more of said satellites, said system comprising a plurality of controllers for processing information and a plurality of associated memories, at least one of said satellites comprising a controller and a memory, and at least one memory in said system storing current knowledge of the orbital paths of all satellites in said system, said satellite and said at least one directional earth-based antenna transmitting information on the same portion of the frequency spectrum, said method comprising the steps of:

(a) one of said controllers calculating, utilizing said knowledge, a set of rules for predicting times of interference with respect to each satellite in said system;

(b) said one controller transmitting said set of rules to at least one of said other memories; and (c) the controller associated with said at least one memory utilizing said set of rules to mitigate the occurrence of interference with communications between said satellite and another satellite within said system by redirecting the at least one directional earth-based antenna to another satellite of the same constellation.

4. A method of predicting and mitigating interference occurring between at least two different communications systems, each system comprising a constellation of communications satellites orbiting the earth, said satellites each comprising a satellite antenna for communicating information, a controller for processing information, and a memory for storing current knowledge of the orbital paths of all satellites in said system, said system comprising a plurality of earth-based stations, each of said earth-based stations comprising at least one directional earth-based antenna for communicating with one or more of said satellites, said satellite and said at least one directional earth-based antenna communicating information utilizing the same portion of the frequency spectrum, said method comprising the steps of:

(a) at least one of said controllers calculating, utilizing said knowledge, a prediction of interference with respect to the satellite associated with said at least one controller; and (b) said at least one controller selecting an option, at the time predicted for said interference, to mitigate said predicted interference, said option comprising redirecting said said at least one earth-based antenna to a different satellite, or switching to a frequency outside of said frequency spectrum.

* * * * *